United States Patent
Hanada et al.

(10) Patent No.: US 8,115,423 B2
(45) Date of Patent: Feb. 14, 2012

(54) MOTOR DRIVING SYSTEM AND CONTROLLING METHOD OF THE SAME

(75) Inventors: Hideto Hanada, Toyota (JP); Hiroyuki Oyanagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 595 days.

(21) Appl. No.: 12/227,555

(22) PCT Filed: Aug. 10, 2006

(86) PCT No.: PCT/JP2006/316132
§ 371 (c)(1),
(2), (4) Date: Nov. 21, 2008

(87) PCT Pub. No.: WO2008/018157
PCT Pub. Date: Feb. 14, 2008

(65) Prior Publication Data
US 2009/0309528 A1    Dec. 17, 2009

(30) Foreign Application Priority Data
Mar. 18, 2005 (JP) .................................. 2005-079835

(51) Int. Cl.
*H02P 1/54* (2006.01)
(52) U.S. Cl. .................... 318/34; 318/400.2; 318/400.26
(58) Field of Classification Search .................... 318/34, 318/400.32, 400.26, 430, 779, 9
See application file for complete search history.

(56) References Cited

U.S. PATENT DOCUMENTS

| 5,742,143 A | 4/1998 | Katagiri |
| 2004/0179830 A1 | 9/2004 | Sunaga et al. |
| 2009/0309528 A1* | 12/2009 | Hanada et al. ........... 318/400.32 |

FOREIGN PATENT DOCUMENTS

| JP | A-08-009671 | 1/1996 |
| JP | A-08-256499 | 10/1996 |
| JP | A-10-080172 | 3/1998 |
| JP | A-11-150873 | 6/1999 |
| JP | A-2001-281270 | 10/2001 |
| JP | A-2003-134885 | 5/2003 |
| JP | A-2004-191301 | 7/2004 |
| JP | A-2004-241560 | 8/2004 |
| JP | A-2004-274975 | 9/2004 |
| JP | A-2006-115664 | 4/2006 |

OTHER PUBLICATIONS

Japanese Office Action issued in Application No. 2005-079835; Dated Aug. 31, 2010 (With Translation).

* cited by examiner

*Primary Examiner* — Karen Masih
(74) *Attorney, Agent, or Firm* — Oliff & Berridge, PLC

(57) ABSTRACT

A plurality of current sensors are provided to correspond to a plurality of inverter circuits for driving a plurality of motor generators, respectively. Zero point adjustment of each current sensor is executed in a non-energized state recognized based on a stop of operation of the corresponding inverter circuit and when noise influence is determined to be small based on stops of operations of the other inverter circuits in the same casing. As a result, it is possible to avoid a risk of performing the zero point adjustment in a state in which an output of the current sensor is not exactly a value corresponding to zero current due to the noise influence from the other inverter circuits. In this way, it is possible to highly accurately execute the zero point adjustment of the current sensor for measuring motor driving current.

15 Claims, 3 Drawing Sheets

MOTOR DRIVING SYSTEM AND CONTROLLING METHOD OF THE SAME

TECHNICAL FIELD

The present invention relates to a motor driving system and more specifically to a motor driving system having a function of zero point adjustment of current sensors (current detectors) and a controlling method of the system.

BACKGROUND ART

In controlling an electric motor (motor), it is necessary to detect a motor driving current with high accuracy. For this purpose, measurement accuracy of a current sensor is improved by properly detecting an electric current offset of the current sensor and correcting the detected offset to thereby learn a zero point of the current sensor (an output value of the current sensor when current=0) over time.

For example, there is a configuration, as disclosed in Japanese Patent Laying-Open No. 10-80172 (Patent Document 1), wherein, for a current sensor (current detector) for detecting driving current of an electric motor, the time interval between a time point when a detected current of the current sensor becomes maximum and a time point when the detected current becomes minimum is calculated successively and an electric current offset arising in the current sensor is detected based on a change in the time interval successively obtained between the maximum point and the minimum point.

With the configuration disclosed in the Patent Document 1, it is possible to properly detect the electric current offset arising in the current sensor to perform offset correction irrespective of a state of the electric motor.

There is an electric current offset value calculator of a semiconductor magnetic sensor generally used as a current sensor mounted on an electric car or the like as disclosed in Japanese Patent Laying-Open No. 2004-191301 (Patent Document 2).

According to the current sensor offset value calculator disclosed in the Patent Document 2, for a magnetic flux detection type ammeter (current sensor) provided for measuring the electric current input to and output from a secondary battery, a current value detected by the current sensor is calculated as an offset value when the polarity of the detected electric current is changed and the current sensor is determined to be in a non-energized state. Especially, in the current sensor value offset calculator disclosed in the Patent Document 2, turning off of an ignition switch is detected to determine the current sensor to be in the non-energized state.

In general, a motor driving device includes a power converter circuit such as an inverter for converting DC power from a secondary battery into AC power for driving an AC motor. In the power converter circuit, electric power semiconductor elements carry out switching operations at high frequencies, which generates electromagnetic wave noise. Therefore, not only the spatial and temporal change in the external magnetic field disclosed in the Patent Document 2 but also the electromagnetic wave associated with the switching operations of the electric power semiconductor elements may become noise for the current sensor. Especially, the electromagnetic wave noise may act on a control board mounted with an integrated circuit (IC) and the like for controlling the current sensor to reduce accuracy of the offset correction (zero point adjustment).

A vehicle driving motor mounted on a vehicle such as a hybrid car, an electric car, or the like is subject to severe layout constraints from a viewpoint of maintaining spaces for occupants and storage in the vehicle. Moreover, the vehicle driving motor needs be driven by relatively large electric current and therefore the switching operations in the power converter circuit involve electromagnetic wave noise of relatively high intensity.

In a motor driving system including a plurality of motors and a plurality of motor driving devices disposed close to each other and represented by a casing where a plurality of vehicle driving motors are mounted on a hybrid car or the like, an error may be caused in offset correction (zero point adjustment) of a current sensor in each motor driving device by noise from the other motor driving devices. In this point, no problem is pointed out in the Patent Documents 1 and 2.

Especially, in the vehicle driving motor mounted on the hybrid car, the motor output need be controlled with high accuracy so as to obtain driving performance according to a requirement of a driver. In general, the motor driving control represented by output torque control involves feedback control of the motor driving current. Therefore, if the zero point adjustment of the current sensor is not carried out properly, an influence of a detection error of the motor driving current causes variation in the motor output (represented by torque pulsation) and an especially large detection error may lead to occurrence of vibration of the vehicle. Consequently, for such use, it is necessary to properly carry out the zero point adjustment of the current sensor to suppress the detection error of the motor driving current.

DISCLOSURE OF THE INVENTION

The present invention has been made to solve the above problems and it is an object of the invention to highly accurately execute zero point adjustment (offset correction) of current sensors for measuring motor driving currents in a motor driving system including a plurality of motors and motor driving devices corresponding to the respective motors.

A motor driving system according to the invention includes a plurality of motors, a motor driving device, a current detector, and a control circuit. The motor driving device is provided to correspond to each of the plurality of motors to generate motor driving current for driving a corresponding motor of the plurality of motors by switching operations of power semiconductor elements. The current detector is provided to correspond to each motor driving device to detect the corresponding motor driving current. The control circuit is formed to control operation of each motor driving device based on at least detected current by each current detector. The control circuit includes a first determining portion for determining a non-energized state in each current detector, a second determining portion for determining, in the current detector determined to be in the non-energized state by the first determining portion, a noise state from the remaining motor driving device other than the motor driving device corresponding to the aforementioned current detector, and zero point adjustment portion for carrying out zero point adjustment of the current detector determined to be in the non-energized state according to determination by the second determining portion.

A controlling method of a motor driving system according to the invention is a control method of the motor driving system including a plurality of motors, a motor driving device, a current detector, and a control circuit and includes first to third steps. The motor driving device is provided to correspond to each of the plurality of motors to generate motor driving current for driving a corresponding motor of the plurality of motors by switching operations of power semiconductor elements. The current detector is provided to correspond to each motor driving device to detect the corresponding motor driving current. The control circuit is configured to control operation of each motor driving device based on at least detected current by each current detector. The first step determines a non-energized state in each current detector. The second step determines, in the current detector determined to be in the non-energized state by the first step, a noise state from the remaining motor driving device other than the motor driving device corresponding to the aforementioned current detector. The third step carries out zero point adjustment of the current detector determined to be in the non-energized state according to determination by the second step.

According to the motor driving system and the controlling method of the system, it is possible to execute the zero point adjustment of each current detector (current sensor) in its non-energized state in which electric current is not supplied from the corresponding motor driving device (inverter circuit) and after the noise state from the other motor driving device is determined. Therefore, it is possible to avoid execution of the zero point adjustment in a state in which an output of the current sensor is not exactly a value corresponding to zero current due to the noise influence from the other motor driving device (inverter circuit). As a result, it is possible to highly accurately carry out the zero point adjustment of the current detector (current sensor). Therefore, it is possible to enhance the detection accuracy of the motor driving current to thereby achieve highly accurate motor driving control.

In the motor driving system according to the invention, the first determining portion preferably determines the current detector to be in the non-energized state when switching operation is at a stop in the motor driving device corresponding to the aforementioned current detector. In the controlling method of the motor driving system according to the invention, the first step determines the current detector to be in the non-energized state when switching operation is at a stop in the motor driving device corresponding to the aforementioned current detector.

With the above motor driving system and controlling method of the system, each current detector (current sensor) is determined to be in the non-energized state when the switching operation is at a stop in the corresponding motor driving device (inverter circuit) and therefore it is possible to easily and accurately detect the non-energized state of each current detector.

In the motor driving system according to the invention, the second determining portion preferably allows execution of the zero point adjustment of the current detector by the zero point adjustment portion when switching operation in the remaining motor driving device is at a stop. In the controlling method of the motor driving system according to the invention, the second step allows execution of the zero point adjustment of the current detector by the third step when switching operation in the remaining motor driving device is at a stop.

In the above motor driving system and controlling method of the system, the noise influence from the other motor driving device is determined to be small and execution of the zero point adjustment is allowed when the switching operation is at a stop in the motor driving device (inverter circuit) other than the motor driving device corresponding to the current detector determined to be in the non-energized state. Therefore, the zero point adjustment is not carried out in a situation in which the electromagnetic wave noise caused by the switching operation in the other motor driving device adversely affects the current detector determined to be in the non-energized state and, as a result, it is possible to carry out accurate zero point adjustment.

In the motor driving system and controlling method of the system according to the invention, the remaining motor driving device is housed in the same casing with the current detector determined to be in the non-energized state.

With the above motor driving device and controlling method of the device, the zero point adjustment of the current detector is carried out when the switching operation is at a stop in the other motor driving device (inverter circuit) housed in the same casing with the current detector determined to be in the non-energized state. Therefore, by reducing the noise influence from outside the casing by providing an electromagnetic wave shield or a magnetic shielding function to the casing, the zero point adjustment is carried out when the switching operation is at a stop in the other motor driving device housed in the same casing with the current detector to thereby enhance the detection accuracy of the motor driving current.

In the motor driving system and the controlling method of the system according to the invention, the motor driving system is preferably mounted on a motor driving system vehicle. The plurality of respective motors are AC motors each configured to generate driving force for the vehicle and each motor driving device is an inverter circuit configured to convert DC electric power into driving electric power for a corresponding one of the AC motors.

With the above motor driving system and controlling method of the system, in the control system for controlling driving of the AC motors configured to generate the vehicle driving force for the hybrid car, the electric car, or the like, it is possible to highly accurately execute the zero point adjustment of the current sensors for detecting the motor driving currents. As a result, it is possible to enhance the detection accuracy of the motor driving current to thereby achieve highly accurate output control of the vehicle driving force generating motors subject to severe layout constraints and electromagnetic wave noise of relatively high intensity due to the switching operations in driving. As a result, it is possible to improve driving performance of the vehicle.

According to the invention, in the motor driving system having the plurality of motors and the motor driving devices corresponding to the respective motors, it is possible to highly accurately execute the zero point adjustment (offset correction) of the current sensors for measuring motor driving currents.

BEST MODES FOR CARRYING OUT THE INVENTION

Figure 1:
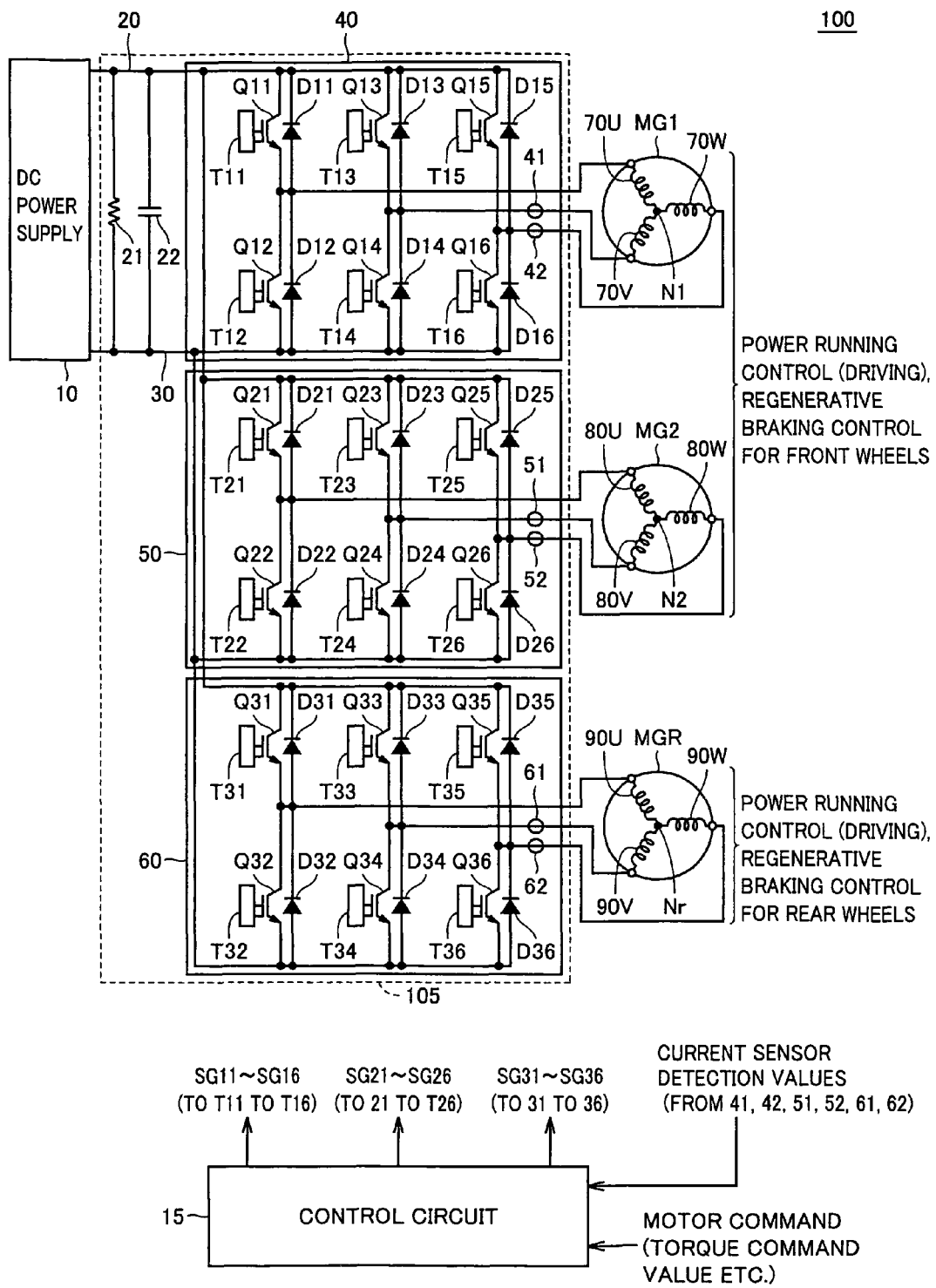
FIG. 1 is a circuit diagram showing a configuration of a motor driving system according to an embodiment of the present invention.

An embodiment of the present invention will be described below in detail with reference to the drawings. In the following description, the same or corresponding portions in the drawings are provided with the same reference numerals and will not described repeatedly in detail in principle.

FIG. 1 is a circuit diagram showing a configuration of a motor driving system 100 according to an embodiment of the present invention. Motor driving system 100 is typically mounted on a hybrid car or an electric car.

With reference to FIG. 1, motor driving system 100 according to the embodiment of the invention includes a DC power supply 10, a control circuit 15, a discharging resistor 21, a smoothing capacitor 22, a plurality of motor generators MG1, MG2, and MGR to be driven, and inverter circuits 40, 50, and 60 for respectively supplying motor driving currents to motor generators MG1, MG2, and MGR. Inverter circuit 40 is provided with current sensors 41, 42 for detecting the motor driving current of motor generator MG1. Similarly, inverter circuit 50 is provided with current sensors 51, 52 for detecting the motor driving current of motor generator MG2 and inverter circuit 60 is provided with current sensors 61, 62 for detecting the motor driving current of motor generator MGR. Inverter circuits 40, 50, and 60 and current sensors 41, 42, 51, 52, 61, and 62 are housed in the same casing 105 and formed in one unit to improve layout efficiency.

DC power supply 10 outputs DC voltage between a power supply line 20 and an earth line 30. DC power supply 10 includes a secondary battery that can be charged or an electric double layer capacitor or the like that is a power storage device. Alternatively, DC power supply 10 may be formed of a combination of a secondary battery and a boost and step-down converter to convert output voltage of the secondary battery and output the voltage between power supply line 20 and earth line 30. In this case, the boost and step-down converter may be formed to be able to carry out bidirectional power conversion to convert the DC voltage between power supply line 20 and earth line 30 into charging voltage for the secondary battery.

Between power supply line 20 and earth line 30, discharging resistor 21 and smoothing capacitor 22 are connected in parallel. Discharging resistor 21 is provided to discharge charge retained by smoothing capacitor 22 when DC power supply 10 is cut off from power supply line 20 and earth line 30 by a relay (not shown).

Inverter circuit 40 has a configuration of a general three-phase inverter and includes electric power semiconductor switching elements (hereinafter also simply referred to as "switching elements") Q11, Q12 forming a U-phase arm, switching elements Q13, 14 forming a V-phase arm, and switching elements Q15, Q16 forming a W-phase arm. Between a collector and an emitter of each of switching elements Q11 to Q16, each of antiparallel diodes D11 to D16 for passing an electric current from the emitter to the collector is connected. As the switching element in the embodiment, an IGBT (Insulated Gate Bipolar Transistor) is employed, for example.

On/off control i.e., switching control of switching elements Q11 to Q16 is carried out by corresponding driving circuits T11 to T16 in response to switching control signals SG11 to SG16 from control circuit 15.

An intermediate point between switching elements Q11, Q12 where U-phase voltage is generated by the switching control is electrically connected to a U-phase coil 70U. Similarly, an intermediate point between switching elements Q13, Q14 where V-phase voltage is generated is electrically connected to a V-phase coil 70V to generate W-phase voltage. Furthermore, an intermediate point between switching elements Q 15, Q 16 where W-phase voltage is generated is electrically connected to a W-phase coil 70W. Motor generator MG1 is a three-phase permanent magnet motor formed by commonly connecting U-phase coil 70U, V-phase coil 70V, and W-phase coil 70W to a neutral point N1.

At least two of wires connecting the respective phase arms of inverter circuit 40 and respective phase coils of motor generator MG1 are provided with current sensors 41, 42, respectively. Because the sum of the motor driving currents (instantaneous values) of U phase, V phase, and W phase is zero, it is possible to detect the motor driving currents of respective phases by disposing current sensors 41, 42 at two phases. Current sensors 41, 42 are typically formed of semiconductor magnetic sensors using Hall elements and generate output voltages corresponding to electric currents passing through corresponding wires. Output voltages (current detection values) by current sensors 41, 42 are sent to control circuit 15.

Inverter circuit 50 is a three-phase inverter formed similarly to inverter circuit 40 and includes switching elements Q21 to Q26 and antiparallel diodes D21 to D26. On/off control (i.e., switching control) of switching elements Q21 to Q26 is carried out by corresponding driving circuits T21 to T26 in response to switching control signals SG21 to SG26 from control circuit 15.

Intermediate points of respective phase arms of inverter circuit 50 are electrically connected to a U-phase coil 80U, a V-phase coil 80V, and a W-phase coil 80W of motor generator MG2, respectively. Motor generator MG2 is a three-phase permanent magnet motor formed by commonly connecting U-phase coil 80U, V-phase coil 80V, and W-phase coil 80W to a neutral point N2 similarly to motor generator MG1.

At least two of wires connecting the respective phase arms of inverter circuit 50 and respective phase coils of motor generator MG2 are provided with current sensors 51, 52, respectively. Current sensors 51, 52 are also typically formed of semiconductor magnetic sensors and their output voltages (current detection values) are sent to control circuit 15.

Inverter circuit 60 is also formed similarly to inverter circuits 40, 50 and includes switching elements Q31 to Q36 and antiparallel diodes D31 to D36. On/off control (i.e., switching control) of switching elements Q31 to Q36 is carried out by corresponding driving circuits T31 to T36 in response to switching control signals SG31 to SG36 from control circuit 15.

Intermediate points of respective phase arms of inverter circuit 60 are electrically connected to a U-phase coil 90U, a V-phase coil 90V, and a W-phase coil 90W of motor generator MGR, respectively. Motor generator MGR is a three-phase permanent magnet motor formed by commonly connecting U-phase coil 90U, V-phase coil 90V, and W-phase coil 90W to a neutral point Nr similarly to motor generators MG1, MG2.

At least two of wires connecting the respective phase arms of inverter circuit 60 and respective phase coils of motor generator MGR are provided with current sensors 61, 62, respectively. Current sensors 61, 62 are also typically formed of semiconductor magnetic sensors and their output voltages (current detection values) are sent to control circuit 15.

Motor generators MG1, MG2 generate driving force for front wheels of the vehicle mounted with motor driving system 100 at a time of power running control while generating electric power to generate AC voltage that becomes a source of charging voltage for the secondary battery included in DC power supply 10 at a time of regenerative braking control. The regenerative braking mentioned here includes braking involving regenerative electric power generation when a foot brake is operated by a driver driving the hybrid car or the electric car and deceleration (or stop of acceleration) of the vehicle while carrying out regenerative electric power generation by turning off an accelerator pedal during traveling without operating the foot brake. Motor generator MGR generates driving force for rear wheels of the vehicle mounted with motor driving system 100 at the time of power running control. Motor generator MGR also generates electric power to generate AC voltage that becomes a source of charging voltage for the secondary battery included in DC power supply 10 at the time of regenerative braking control.

Control circuit 15 controls operation of motor driving system 100 so as to carry out motor driving control according to driving commands (torque commands, rotation speed commands) of motor generators MG1, MG2, and MGR. Besides current detection values by current sensors 41, 42, 51, 52, 61, and 62, input voltages to respective inverter circuits 40, 50, 60, rotation speeds of motor generators MG1, MG2, MGR, and coil terminal voltages, and the like detected by sensors (not shown) provided properly are input to control circuit 15 and used for motor driving control.

Control circuit 15 generates switching control signals SG1 to SG16 for converting DC voltage between power supply line 20 and earth line 30 into AC voltages applied to the respective phase coils of motor generator MG1 so that motor driving current according to the torque command value of motor generator MG1 is supplied. At the time of regenerative braking control of motor generator MG1, control circuit 15 generates switching control signals SG11 to SG16 so as to convert the AC voltages generated by motor generator MG1 into DC voltage between power supply line 20 and earth line 30.

Furthermore, control circuit 15 generates switching control signals SG21 to SG26 and SG31 to SG36 for controlling driving of motor generators MG2, MGR similarly to switching control signals SG11 to SG16.

For the above-described motor driving control, control circuit 15 carries out feedback control for causing an actual value of motor driving current to follow a current target value according to the torque command value of the motor generator. The actual value Iact of motor driving current used for this feedback control can be calculated according to the following equation (1), where a measured value by the corresponding current sensor is Idet.

$$Iact = Idet - Iz \tag{1}$$

Iz in equation (1) represents a zero point value reflecting offset and corresponds to the detection value of the current sensor when the actual electric current is zero (Iact=0). In other words, in order to enhance detection accuracy of the motor driving currents by the current sensors and carry out the motor driving control by motor driving system 100 with high accuracy, it is necessary to properly carry out zero point adjustment of the respective current sensors.

Figure 2:
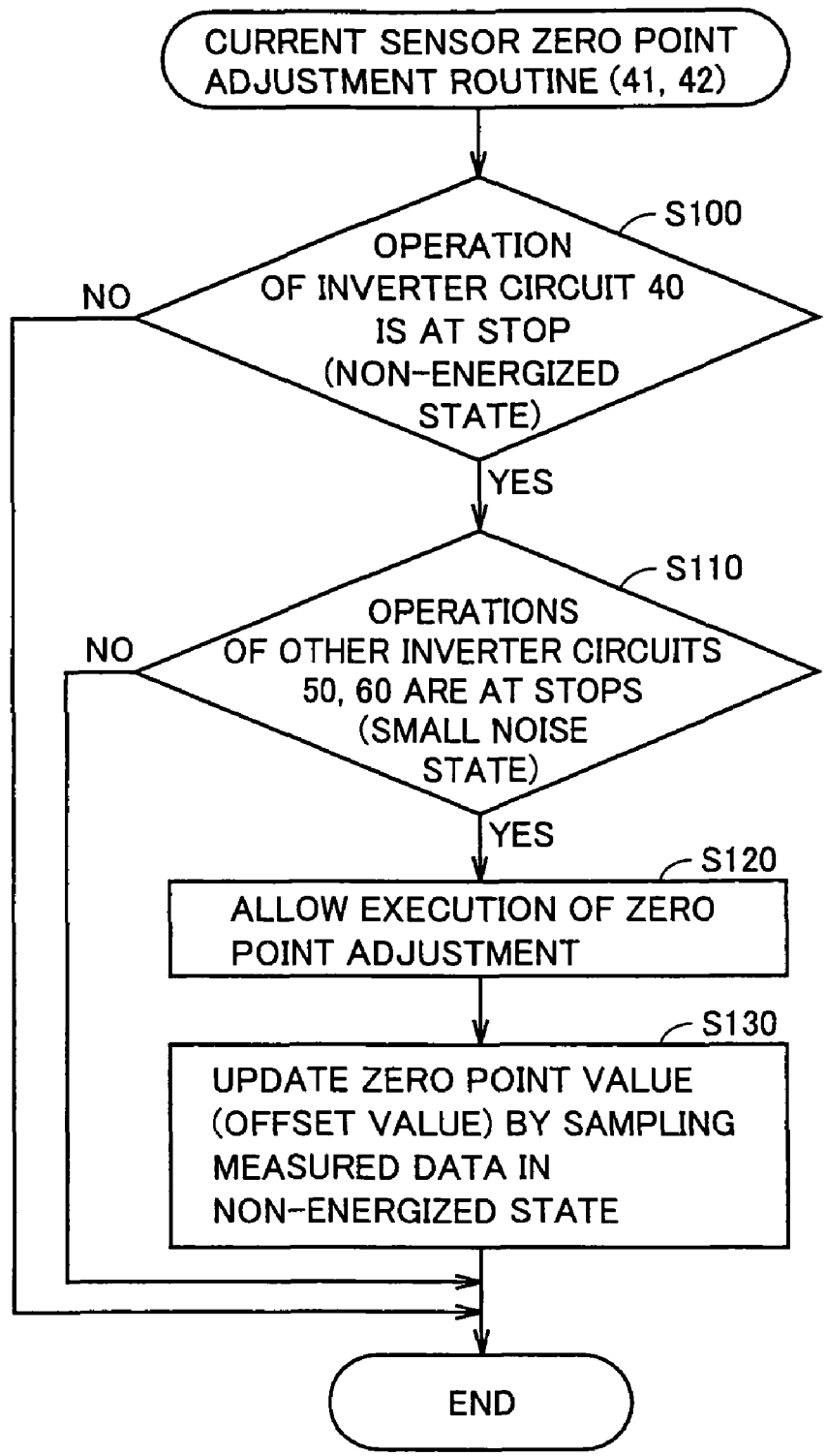
FIG. 2 is a flow chart for explaining a zero point adjustment routine of a current sensor in the motor driving system according to the embodiment of the invention.

FIG. 2 is a flow chart for explaining the zero point adjustment routine of the current sensor in the motor driving system according to the embodiment of the invention. FIG. 2 shows the zero point adjustment routine of current sensors 41, 42 corresponding to inverter circuit 40 as an example.

With reference to FIG. 2, control circuit 15 determines whether or not current sensors 41, 42 are in non-energized states based on whether or not operation of inverter circuit 40 corresponding to current sensors 41, 42 is at a stop, i.e., whether or not switching operations of switching elements Q11 to Q16 are at stops in step S100.

If the operation of inverter circuit 40 is not at a stop (NO judgment in step S100), current sensors 41, 42 are in energized states and therefore it is impossible to execute the zero point adjustment. Therefore, the zero point adjustment routine is finished without carrying out the zero point adjustment.

On the other hand, at a time of the stop of the operation of inverter circuit 40 (YES judgment in step S100) when current sensors 41, 42 are determined to be in the non-energized state, whether or not switching operations of the other inverter circuits 50, 60 are at stops is judged to determine the noise states of current sensors 41, 42.

For example, if operations of the other inverter circuits 50, 60 are not at stops (NO judgment in step S110), the detection values of current sensors 41, 42 may not be values that accurately correspond to states of zero currents due to the electromagnetic wave noise generated by the switching operations in inverter circuits 50, 60, though current sensors 41, 42 are in non-energized states. Therefore, in such a casing, control circuit 15 makes execution of zero point adjustment impossible to thereby prevent occurrence of the zero point adjustment error.

On the other hand, when operations of the other inverter circuits 50, 60 are at stops (YES judgment in step S110), control circuit 15 determines current sensors 41, 42 to be in the non-energized states and an influence of noise from the other inverter circuits to be small and allows execution of the zero point adjustment (step S120).

Control circuit 15 samples measurement data (output values) of the respective current sensors in the non-energized state (electric current=0) predetermined times in execution of the zero point adjustment. If this sampling is executed normally, a zero point value (offset value) is updated based on an average value of sampled data (step S130). On the other hand, if the sampling is not executed normally, e.g., if the number of sampled data is insufficient or the sampled data includes abnormal values, the zero point value is not updated.

At the time of operation of the motor driving system from then on, the motor driving current of motor generator MG1 is detected by arithmetic according to equation (1) using the zero point value (offset value) based on detection values by current sensors 41, 42.

Current sensor adjustment routines for current sensors 51, 52 provided to correspond to inverter circuit 50 and current sensors 61, 62 provided to correspond to inverter circuit 60 are also configured similarly to that in FIG. 2. In other words, the non-energized state in step S100 is determined based on the stop of operation of the inverter circuit corresponding to the respective current sensors and the noise state of the current sensor that is a target of the zero point adjustment is determined based on the stops of the operations of the inverter circuits other than the corresponding inverter circuit in step S110.

With such a configuration, in the motor driving system mounted with the plurality of motors and the plurality of corresponding motor driving devices (inverters), it is possible to carry out the zero point adjustment of the current sensors corresponding to each inverter circuit with high accuracy while eliminating noise influence from the other inverter circuits.

Moreover, in the semiconductor magnetic sensor using the Hall element, detection characteristic of the current sensor tends to change according to the temperature. Therefore, by making it possible to successively execute the zero point adjustment of the current sensors at the time of stops of operations of inverter circuits 40 to 60, it is possible to enhance the detection accuracy of the motor driving current to thereby achieve highly accurate motor driving control.

Especially, by reducing the noise influence from outside casing 105 by providing an electromagnetic shield or a magnetic shielding function to casing 105, it is possible to carry out the highly accurate zero point adjustment at the time of stops of operations of the other inverter circuits in the same casing following the flow chart shown in FIG. 2.

With regard to the stop of operation of each inverter circuit in steps S100 and S110 in FIG. 2, the stop of operation of the inverter circuit may be recognized when operation of the corresponding motor generator becomes unnecessary and the inverter circuit is shut down according to the driving condition. The above-described shutdown state of the inverter circuit is set according to shift position selection in the vehicle mounted with motor driving system 100.

Figure 3:
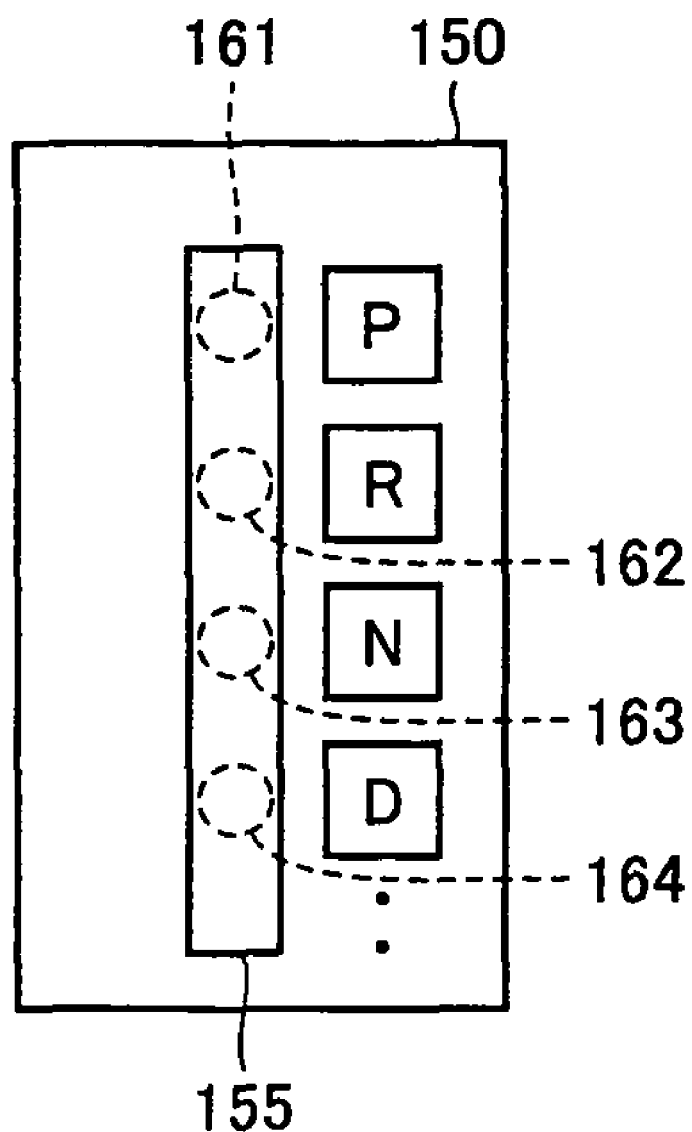
FIG. 3 is a drawing for explaining shift position selection in a vehicle mounted with the motor driving system according to the embodiment of the invention.

FIG. 3 is a block diagram showing a configuration of shift position selection in the vehicle mounted with motor driving system 100.

With reference to FIG. 3, a shift position selector 150 includes a guide path 155 for a shift lever (not shown) and selects one shift position from a plurality of shift positions in response to a position of the shift lever on guide path 155. A driver can change the shift position by moving the shift lever against a biasing force.

On guide path 155, a position sensor (not shown) for detecting in which of defined shift lever positions 161 to 164 the shift lever is positioned is provided. According to an output from the position sensor, one shift position is selected from a parking position (P position) for a stop of the vehicle, a reverse position (R position) for reverse traveling of the vehicle, a neutral position (N position), and a drive position (D position) for forward traveling of the vehicle respectively corresponding to shift lever positions 161 to 164.

For example, in the parking position (P position) for the stop of the vehicle, operations of inverter circuits 40, 50 corresponding to motor generators MG1, MG2 may be made possible for charging of the battery and inverter circuit 60 corresponding to motor generator MGR may be shut down. On the other hand, in the neutral position (N position), operations of respective inverter circuits 40 to 60 may be shut down.

As a result, when the shift lever is operated from the parking position (P position) to the drive position (D position) via the neutral position (N position) to start driving of the vehicle, if a predetermined time (about several hundred [ms], in general) is taken to pass through the neutral position (N position) so as to normally execute step S130 in FIG. 2, the zero point adjustment of the current sensors can be executed before the start of driving of the vehicle.

In FIG. 3, besides the drive position (0 position), drive positions (e.g., 4 position, 3 position, 2 position, L position, and the like) may be provided as subdivisions for limiting the number of shift stages to which gear shifting is possible. In this casing, the position sensor may be disposed so as to increase the number of defined shift lever positions according to the number of shift positions.

Here, correspondences between components shown in the embodiment and components in the invention will be described. Motor generators MG1, MG2, MGR correspond to "a plurality of motors" in the invention and respective inverter circuits 40, 50, 60 correspond to "motor driving devices" in the invention. Step S100 in FIG. 2 corresponds to "a first determining means" in the invention, step S110 corresponds to "a second determining means", and steps S120, S130 correspond to "zero point adjustment means" in the invention.

The embodiments disclosed this time are examples in all points and should not be considered restrictive. The scope of the invention is not defined in the above description but is defined in claims and includes meanings equivalent to the claims and all modifications in the scope of claims.

INDUSTRIAL APPLICABILITY

The present invention can be applied to a motor driving system including current sensors.

The invention claimed is:

1. A motor driving system comprising:
a plurality of motors;
a motor driving device provided to correspond to each of said plurality of motors to generate motor driving current for driving a corresponding motor of said plurality of motors by switching operations of power semiconductor elements;
a current detector provided to correspond to each said motor driving device to detect the corresponding motor driving current; and
a control circuit for controlling operation of each said motor driving device based on at least detected current by each said current detector,
wherein:
said control circuit comprises:
first determining means for determining a non-energized state in each said current detector;
second determining means for determining, in the current detector determined to be in said non-energized state by said first determining means, a noise state from the remaining motor driving device other than the motor driving device corresponding to said current detector; and
zero point adjustment means for carrying out zero point adjustment of said current detector determined to be in said non-energized state according to determination by said second determining means, and
said second determining means allows execution of said zero point adjustment of the current detector by said zero point adjustment means when switching operation in said remaining motor driving device is at a stop.

2. The motor driving system according to claim 1, wherein said the remaining motor driving device is housed in the same casing with said current detector determined to be in said non-energized state.

3. The motor driving system according to claim 1, wherein said motor driving system is mounted on a vehicle, said plurality of motors are AC motors each configured to generate driving force for said vehicle, and each said motor driving device is an inverter circuit configured to convert DC electric power into driving electric power for a corresponding one of said AC motors.

4. A motor driving system comprising:
a plurality of motors;
a motor driving device provided to correspond to each of said plurality of motors to generate motor driving current for driving a corresponding motor of said plurality of motors by switching operations of power semiconductor elements;
a current detector provided to correspond to each said motor driving device to detect the corresponding motor driving current; and
a control circuit for controlling operation of each said motor driving device based on at least detected current by each said current detector,
wherein:
said control circuit comprises:
first determining means for determining a non-energized state in each said current detector;
second determining means for determining, in the current detector determined to be in said non-energized state by said first determining means, a noise state from the remaining motor driving device other than the motor driving device corresponding to said current detector; and
zero point adjustment means for carrying out zero point adjustment of said current detector determined to be in said non-energized state according to determination by said second determining means, and
said first determining means determines the current detector to be in said non-energized state when switching operation is at a stop in said motor driving device corresponding to said current detector.

5. The motor driving system according to claim 4, wherein said second determining means allows execution of said zero point adjustment of the current detector by said zero point adjustment means when switching operation in said remaining motor driving device is at a stop.

6. A motor driving system comprising:
a plurality of motors;
a motor driving device provided to correspond to each of said plurality of motors to generate motor driving current for driving a corresponding motor of said plurality of motors by switching operations of power semiconductor elements;
a current detector provided to correspond to each said motor driving device to detect the corresponding motor driving current; and
a control circuit that controls operation of each said motor driving device based on at least detected current by each said current detector,
wherein:
said control circuit comprises:
a first determining portion that determines a non-energized state in each said current detector;
a second determining portion that determines, in the current detector determined to be in said non-energized state by said first determining portion, a noise state from the remaining motor driving device other than the motor driving device corresponding to said current detector; and
zero point adjustment portion that carries out zero point adjustment of said current detector determined to be in said non-energized state according to determination by said second determining portion; and
said second determining portion allows execution of said zero point adjustment of the current detector by said zero point adjustment portion when switching operation in said remaining motor driving device is at a stop.

7. The motor driving system according to claim 6, wherein said remaining motor driving device is housed in the same casing with said current detector determined to be in said non-energized state.

8. The motor driving system according to claim 6, wherein said motor driving system is mounted on a vehicle, said plurality of motors are AC motors each configured to generate driving force for said vehicle, and
each said motor driving device is an inverter circuit configured to convert DC electric power into driving electric power for a corresponding one of said AC motors.

9. A motor driving system comprising:
a plurality of motors;
a motor driving device provided to correspond to each of said plurality of motors to generate motor driving current for driving a corresponding motor of said plurality of motors by switching operations of power semiconductor elements;
a current detector provided to correspond to each said motor driving device to detect the corresponding motor driving current; and
a control circuit that controls operation of each said motor driving device based on at least detected current by each said current detector,
wherein:
said control circuit comprises:
a first determining portion that determines a non-energized state in each said current detector;
a second determining portion that determines, in the current detector determined to be in said non-energized state by said first determining portion, a noise state from the remaining motor driving device other than the motor driving device corresponding to said current detector; and
a zero point adjustment portion that carries out zero point adjustment of said current detector determined to be in said non-energized state according to determination by said second determining portion; and
said first determining portion determines the current detector to be in said non-energized state when switching operation is at a stop in said motor driving device corresponding to said current detector.

10. The motor driving system according to claim 9, wherein said second determining portion allows execution of said zero point adjustment of the current detector by said zero point adjustment portion when switching operation in said remaining motor driving device is at a stop.

11. A controlling method of a motor driving system, wherein said motor driving system includes:
a plurality of motors;
a motor driving device provided to correspond to each of said plurality of motors to generate motor driving current for driving a corresponding motor of said plurality of motors by switching operations of power semiconductor elements;
a current detector provided to correspond to each said motor driving device to detect the corresponding motor driving current; and
a control circuit for controlling operation of each said motor driving device based on at least detected current by each said current detector,
said controlling method includes:
a first step for determining a non-energized state in each said current detector;
a second step for determining, in the current detector determined to be in said non-energized state by said first determining step, a noise state from the remaining motor driving device other than the motor driving device corresponding to said current detector; and
a third step for carrying out zero point adjustment of said current detector determined to be in said non-energized state according to determination by said second step,
wherein said second step allows execution of said zero point adjustment of the current detector by said third step when switching operation in said remaining motor driving device is at a stop.

12. The controlling method of the motor driving system according to claim 11, wherein said remaining motor driving device is housed in the same casing with said current detector determined to be in the non-energized state.

13. The controlling method of the motor driving system according to claim 11, wherein said motor driving system is mounted on a vehicle, said plurality of motors are AC motors each configured to generate driving force for said vehicle, and
each said motor driving device is an inverter circuit configured to convert DC electric power into driving electric power for a corresponding one of said AC motors.

14. A controlling method of a motor driving system, wherein said motor driving system includes:
a plurality of motors;
a motor driving device provided to correspond to each of said plurality of motors to generate motor driving current for driving a corresponding motor of said plurality of motors by switching operations of power semiconductor elements;

a current detector provided to correspond to each said motor driving device to detect the corresponding motor driving current; and a control circuit for controlling operation of each said motor driving device based on at least detected current by each said current detector;

said controlling method includes:

a first step for determining a non-energized state in each said current detector;

a second step for determining, in the current detector determined to be in said non-energized state by said first determining step, a noise state from the remaining motor driving device other than the motor driving device corresponding to said current detector; and a third step for carrying out zero point adjustment of said current detector determined to be in said non-energized state according to determination by said second step; and wherein said first step determines the current detector to be in said non-energized state when switching operation is at a stop in said motor driving device corresponding to said current detector.

15. The controlling method of the motor driving system according to claim 14, wherein said second step allows execution of said zero point adjustment of the current detector by said third step when switching operation in said remaining motor driving device is at a stop.

* * * * *